(12) United States Patent
Denker et al.

(10) Patent No.: US 7,037,461 B1
(45) Date of Patent: May 2, 2006

(54) METHOD OF STRETCHING FILM

(75) Inventors: Martin E. Denker, Vadnais Heights, MN (US); Joseph T. Bartusiak, Osseo, MN (US); Anthony B. Ferguson, Lake Elmo, MN (US); Thomas P. Hanschen, St. Paul, MN (US); Jeffery N. Jackson, Woodbury, MN (US); William Ward Merrill, White Bear Lake, MN (US); Susan J. Newhouse, Houlton, WI (US); Fred J. Roska, Woodbury, MN (US); Richard J. Thompson, Lino Lakes, MN (US); Chiu Ping Wong, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/469,972

(22) Filed: Dec. 21, 1999

(51) Int. Cl.
B29C 55/16 (2006.01)
B29C 55/06 (2006.01)
B29C 55/08 (2006.01)
B29C 35/16 (2006.01)
B29C 71/02 (2006.01)

(52) U.S. Cl. ............ 264/519; 264/210.5; 264/210.7; 264/235.8; 264/237; 264/288.4; 264/290.2; 264/327; 264/346; 264/348

(58) Field of Classification Search ............ 264/210.5, 264/210.7, 288.4, 290.2, 235.8, 237, 346, 264/348, 327, 519
See application file for complete search history.

(56) References Cited

U.S. PATENT DOCUMENTS

| | | | | |
|---|---|---|---|---|
| 2,618,012 A | | 11/1952 | Milne | |
| 2,851,733 A | * | 9/1958 | Pangonis et al. | |
| 2,896,262 A | * | 7/1959 | Herrmann | |
| 3,046,599 A | | 7/1962 | Nicholas et al. | ............... 26/57 |
| 3,132,375 A | * | 5/1964 | Koppehele | |
| 3,150,433 A | | 9/1964 | Kampf | ........................ 26/57 |
| 3,231,642 A | | 1/1966 | Goldman et al. | ............ 264/567 |
| 3,271,495 A | * | 9/1966 | Gronholz et al. | ........ 264/210.7 |
| 3,396,216 A | * | 8/1968 | Yumoto et al. | |
| 3,502,766 A | | 3/1970 | Tsuruta et al. | ............... 264/289 |
| 3,510,552 A | | 5/1970 | Tsuruta et al. | ............... 264/289 |
| 3,551,546 A | * | 12/1970 | Gosper et al. | |
| 3,890,421 A | | 6/1975 | Habozit | ........................ 264/289 |

(Continued)

FOREIGN PATENT DOCUMENTS

| | | |
|---|---|---|
| FR | 2250625 | 6/1975 |
| FR | 2 317 076 | 2/1977 |
| WO | WO 98 25753 A2 | 6/1998 |
| WO | WO 98/25754 A1 | 6/1998 |

OTHER PUBLICATIONS

Derwent Abstract of KR 9006301B, 1991, Derwent Information Limited.*

*Primary Examiner*—Michael P. Colaianni
*Assistant Examiner*—Michael I. Poe

(57) ABSTRACT

A method of stretching films in which all or a portion of the width of the film is cooled during or just after stretching so as to improve the uniformity of the film. The includes stretching a polymeric film in a tenter that grasps the film with a plurality of clips along the opposing edges of the film and propels the clips to thereby stretch the film. The tenter includes driven clips and idler clips, with at least one idler clip between respective pairs of driven clips. The cooling is done so as to improve the uniformity of the clip spacing relative to the spacing obtained at otherwise identical process conditions without such cooling.

68 Claims, 2 Drawing Sheets

OTHER PUBLICATIONS

| | | | |
|---|---|---|---|
| 2,851,733 A | * | 9/1958 | Pangonis et al. |
| 2,896,262 A | * | 7/1959 | Herrmann |
| 3,046,599 A | | 7/1962 | Nicholas et al. ............... 26/57 |
| 3,132,375 A | * | 5/1964 | Koppehele |
| 3,150,433 A | | 9/1964 | Kampf ......................... 26/57 |
| 3,231,642 A | | 1/1966 | Goldman et al. ........... 264/567 |
| 3,271,495 A | * | 9/1966 | Gronholz et al. ........ 264/210.7 |
| 3,396,216 A | * | 8/1968 | Yumoto et al. |
| 3,502,766 A | | 3/1970 | Tsuruta et al. .............. 264/289 |
| 3,510,552 A | | 5/1970 | Tsuruta et al. .............. 264/289 |
| 3,551,546 A | * | 12/1970 | Gosper et al. |
| 3,890,421 A | | 6/1975 | Habozit ...................... 264/289 |
| 4,237,088 A | | 12/1980 | Yoshimura et al. ...... 264/235.8 |
| 4,330,499 A | | 5/1982 | von und zu Aufsess et al. ...................... 264/289.6 |
| 4,525,317 A | | 6/1985 | Okada et al. ............ 264/235.8 |
| 4,595,738 A | | 6/1986 | Hufnagel et al. ........ 526/348.1 |
| 4,652,409 A | | 3/1987 | Leese et al. ................... 264/22 |
| 4,675,582 A | | 6/1987 | Hommes et al. .............. 318/38 |
| 4,825,111 A | | 4/1989 | Hommes et al. .............. 310/12 |
| 4,853,602 A | | 8/1989 | Hommes et al. .............. 318/38 |
| 5,036,262 A | | 7/1991 | Schonbach ................... 318/38 |
| 5,051,225 A | | 9/1991 | Hommes et al. ......... 264/288.4 |
| 5,072,493 A | | 12/1991 | Hommes et al. ................ 26/72 |
| 5,429,785 A | | 7/1995 | Jolliffe ...................... 264/216 |
| 5,575,968 A | * | 11/1996 | Seo et al. .................... 264/481 |
| 5,753,172 A | | 5/1998 | Forrest, Jr. et al. ......... 264/481 |
| 6,303,067 B1 | * | 10/2001 | Wong et al. .............. 264/289.6 |
| 6,358,457 B1 | * | 3/2002 | Wong et al. .............. 264/289.6 |

* cited by examiner

METHOD OF STRETCHING FILM

TECHNICAL FIELD

The present invention generally relates to methods of stretching films and to the resulting films, and more particularly to methods of stretching films in which all or a portion of the width of the film is cooled during or just after stretching so as to improve the uniformity of the film and to the resulting films.

BACKGROUND OF THE INVENTION

It has been known in the art to biaxially stretch films. Additionally, several methods and apparatuses have been described for biaxially stretching films simultaneously in two directions. See, e.g., U.S. Pat. Nos. 2,618,012; 3,046, 599; 3,502,766; 3,890,421; 4,330,499; 4,525,317; and 4,853,602.

Tenters have been used for the transverse direction stretching in sequential biaxial film stretching processes. For a simultaneous biaxial stretching process, tenter stretching is performed on a tenter apparatus that has grips or clippers that grasp the film along the opposing edges of the film and propels the grasping means at varying speeds along guiding means, which typically are rails. As used herein, "grippers" and "clips" include other film-edge grasping means, and the word "rails" includes other clip guide means. By increasing clip speed in the machine direction, stretching in the machine direction occurs. By using such means as diverging rails, transverse direction stretching occurs. Such stretching can be accomplished, for example, by the methods and apparatus disclosed in U.S. Pat. Nos. 4,330,499 and 4,595, 738, in which each of the clips is mechanically driven in the tenter apparatus. More recently, tenter frames for stretching films have been described in which the clips that propel the film through the tenter apparatus are driven by linear motors. See, e.g., the methods and tenter apparatus disclosed in U.S. Pat. Nos. 4,675,582; 4,825,111; 4,853,602; 5,036,262; 5,051,225; and 5,072,493.

In the simultaneous biaxial stretching apparatus described in U.S. Pat. No. 5,051,225, tenter clips are driven by linear electric motors. For reasons of spacing and cost, tenters such as described in the '225 patent may not have every clip driven by a linear motor. For example, every third clip on each rail may be driven by a linear motor with the intervening two clips being nondriven, and thus propelled forward only by the film itself. Such nondriven clips are referred to as idler clips. It has been observed that the relative position of the idler clips to the driven clips is not necessarily the ideal position of being equally spaced between driven clips. Any inequality in the clip-to-clip spacing among two nearest-neighbor driven clips on a rail and their intervening idler clips may be referred to using such terms as idler non-uniformity, uneven clip spacing, non-uniform clip spacing, and the like. Two special cases, however, are important. The case in which the first and last (or only) idler clip(s) between a pair of driven clips on a rail are propelled forward by the film in an amount less than would be necessary for equal spacing among clips is referred to as idler lag or lagging. The case in which the first and last (or only) idler clip(s) between a pair of driven clips on a rail are propelled forward by the film in an amount greater than would be necessary for equal spacing among clips is referred to as idler lead or leading. In the case where there is more than one idler clip between each pair of driven clips on each rail, it is possible to have one propelled forward by the film in an amount less than would be necessary for equal spacing among clips and, simultaneously, to have the other propelled forward by the film in an amount greater than would be necessary for equal spacing among clips. This situation results in an uneven clip spacing, or idler non-uniformity, which is neither an idler lag nor an idler lead.

U.S. Pat. No. 5,753,172 describes a process for the simultaneous biaxial stretching in a tenter frame of a thermoplastic polymer film having beaded edges, comprising gripping the beaded edges of the film with tenter clips and increasing the temperature of the beaded edges to within the film orientation temperature range prior to or during simultaneous stretching, and in subsequent stretching or heat-setting steps, by focusing heat on the beaded edges of the film. The '172 patent states that bead temperatures that are either too high or too low or beads that are too thin can cause the spacing of the idler clips to be non-uniform. Column 3, lines 30–33; column 1, lines 58–62. The '172 patent further states that it is generally desirable for the temperature of the beads to be approximately equal to, or higher than, the temperature of the central film web. Column 5, lines 27–29. The '172 patent also states that the need for separate control of bead temperatures is driven in part by the unequal heating applied to the beads compared to the film in typical stretcher heating zones. Col. 5, lines 33–35. It is both well-known in the art and demonstrated in the '172 patent (Col. 11, lines 35–40) that such unequal heating in typical stretcher heating zones leads to the beads being cooler than the central film web. U.S. Pat. Nos. 3,231,642; 3,510,552; and 5,429,785 also discuss certain effects of temperature control in various film stretching processes.

SUMMARY OF THE INVENTION

The present inventors have discovered that by cooling all or a portion of the width of the film by an effective amount during and/or just after stretching, clip spacing non-uniformity, particularly idler clip lagging, can be minimized to provide more uniformly spaced idler clips, and to provide a final film with more uniform properties and characteristics. Cooling can also be used to cause idler clip leading, if desired.

In the simultaneous biaxial stretching apparatus of the type described in the 225 patent discussed above, tenter clips are driven by linear electric motors. For spacing or cost reasons, not every clip is driven by a linear motor. For example, every second or every third clip on each rail may be driven with the intervening idler clip(s) being nondriven, and thus propelled forward only by the film itself. The relative position of the idler clips to the driven clips is a complex result of the interactions of film and process variables, such as the film's visco-elastic properties (e.g. stress as a function of strain rate history) and caliper profile, and the stretching and temperature profiles as functions of position along the tenter. Idler clips are propelled forward through the tenter by force imparted by the driven clip in front of the idler(s) and the film material between them. At the same time, the forward motion of each idler clip may be resisted by force imparted by the driven clip and film material behind it. As the film is stretched in the machine and transverse directions downweb, a complex interaction among the film material, the idler and driven clips, and the bearing frictions within the clips usually results in a net backward force on an idler clip, when viewed in a frame of reference which is moving with the forward driven clip. Since there is no linear motor force on the idler clips to counter this force, the idler clips lag behind their ideal positions. At the exit end of the tenter, where the film has been cooled, the idler lagging may be accompanied by permanent downweb variations in machine direction draw ratio that extend across the width of the film. Idler clip lagging is a result of processing conditions which also adversely affect the uniformity of the film properties such as caliper, mechanical properties, and optical properties. Idler clip lagging occurs at different locations in the process and to greater or lesser extents depending upon the material and the stretching conditions. Thus, it would be most advantageous to control the clip lagging throughout the process (lag history), though we believe there will be considerable advantage to controlling the magnitude of the overall, or final, clip lagging.

The present invention provides methods to reduce clip lagging to cause the idler clips to be closer to or at their ideal positions relative to adjacent driven clips, and in some cases to reverse clip lagging, causing the idler clips to be in front of their ideal positions (idler lead). One method is edge cooling. In edge cooling, the edge portions of the film are cooled an effective amount at effective locations in the stretch section of the tenter and/or in the section immediately after the stretch section, referred to herein as the post-stretch treatment section. Edge cooling is believed to increase the modulus of elasticity of the material at the edge portions in a controlled fashion so that an idler clip is pulled forward more than would be the case without edge cooling by the driven clip and stiffer (cooler) edge bead in front of it, resulting in a decrease in clip lagging. As a result, the idler clip lagging is reduced, eliminated, or reversed (idler lead). A second method is zone cooling, in which substantially the entire width of the web is cooled an effective amount at effective locations, or zones, in the stretch section of the tenter and/or in the post-stretch treatment section. Zone cooling is believed to increase the modulus of elasticity of the film across substantially the entire width of the web in a controlled fashion, so that an idler clip is pulled forward by the driven clip and film in front of it more than would be the case without zone cooling, resulting in a decrease of the backward force that causes clip lagging without zone cooling.

One aspect of the present invention provides an improvement to the method of stretching a polymeric film comprising the steps of grasping the film with a plurality of clips along the opposing edges of the film and propelling the clips to thereby stretch the film. The plurality of clips includes driven clips and idler clips, with at least one idler clip between respective pairs of driven clips. The improvement comprises heating the polymeric film to a sufficiently high temperature to allow a significant amount of stretching without breaking, and actively imparting a machine direction cooling gradient to at least a portion of the width of the stretched film in an effective amount to improve the uniformity of spacing of the driven and idler clips.

In another aspect, the present invention provides an improvement to the method of stretching a polymeric film comprising the steps of grasping the film with a plurality of clips along the opposing edges of the film and propelling the clips to thereby stretch the film. The plurality of clips includes driven clips and idler clips, with at least one idler clip between respective pairs of driven clips. The improvement comprises heating the center portion and edge portions of the polymeric film to a sufficiently high temperature to allow a significant amount of stretching without breaking, maintaining, at the onset of stretching, the edge portions of the film no hotter than the center portion of the film, and imparting a machine direction cooling gradient to at least a portion of the width of the stretched film in an effective amount to improve the uniformity of spacing of the driven and idler clips.

In one preferred embodiment of the above method, maintaining the edge portions of the film no hotter than the center portion of the film includes actively cooling the opposed edge portions of the film.

In still another aspect, the present invention provides an improvement to the method of stretching a polymeric film comprising the steps of grasping the film with a plurality of clips along the opposing edges of the film and propelling the clips to thereby stretch the film. The plurality of clips includes driven clips and idler clips, with at least one idler clip between respective pairs of driven clips. The improvement comprises heating the polymeric film to a sufficiently high temperature to allow a significant amount of stretching without breaking, and imparting a machine direction cooling gradient to at least a portion of the width of the stretched film in an effective amount to reduce the value of idler clip lag from the value of idler clip lag in the absence of said cooling.

In yet another aspect, the present invention provides an improvement to the method of stretching a polymeric film comprising the steps of grasping the film with a plurality of clips along the opposing edges of the film and propelling the clips to thereby stretch the film. The plurality of clips includes driven clips and idler clips, with at least one idler clip between respective pairs of driven clips. The improvement comprises heating the polymeric film to a sufficiently high temperature to allow a significant amount of stretching without breaking, and imparting a cooling gradient to at least a portion of the width of the stretched film in an effective amount to improve the downweb caliper uniformity relative to the downweb caliper uniformity in the absence of said cooling.

In still another aspect, the present invention provides an improvement to the method of stretching a pre-crystallized polymeric film comprising the steps of grasping the film with a plurality of clips along the opposing edges of the film and propelling the clips to thereby stretch the film. The plurality of clips includes driven clips and idler clips, with at least one idler clip between respective pairs of driven clips. The improvement comprises heating the polymeric film to a sufficiently high temperature to allow a significant amount of stretching without breaking, and imparting a cooling gradient to at least a portion of the width of the stretched film in an effective amount to improve the uniformity of spacing of the driven and idler clips.

In yet another aspect, the present invention provides an improvement to the method of stretching a vinyl polymer film comprising the steps of grasping the film with a plurality of clips along the opposing edges of the film and propelling the clips to thereby stretch the film. The plurality of clips includes driven clips and idler clips, with at least one idler clip between respective pairs of driven clips. The improvement comprises heating the polymeric film to a sufficiently high temperature to allow a significant amount of stretching without breaking, and imparting a cooling gradient to at least a portion of the width of the stretched film in an effective amount to improve the uniformity of spacing of the driven and idler clips.

In one preferred embodiment of the any of the above methods, the opposed edge portions of the film are cooled.

In another preferred embodiment of any of the above methods, the center portion of the film is cooled.

In another preferred embodiment of any of the above methods, substantially the entire width of the film is cooled.

In another preferred embodiment of any of the above methods, at least a portion of the film is cooled by at least 3° C.

In another preferred embodiment of any of the above methods, the clips are propelled through a stretch section in which the film is stretched and subsequently through a post-stretch treatment section, and the cooling is performed in at least one of the stretch section and the treatment section.

In another preferred embodiment of any of the above methods, the film is biaxially stretched. More preferably, the film is simultaneously biaxially stretched by propelling' the clips at varying speeds in the machine direction along clip guide means that diverge in the transverse direction. Still more preferably, the film is stretched to a final stretch ratio of at least 2:1 in the machine direction and at least 2:1 in the transverse direction.

In another preferred embodiment of any of the above methods, there are at least two idler clips between each respective pair of driven clips.

In another preferred embodiment of any of the above methods, the film comprises a thermoplastic film. More preferably, the film comprises a semi-crystalline film. Of the semi-crystalline embodiments, one preferred film has a degree of crystallinity greater than about 1% prior to the heating. Still more preferably, the degree of crystallinity is greater than about 7% prior to the heating. Still more preferably, the degree of crystallinity is greater than about 30% prior to the heating.

In another preferred embodiment of any of the first four or the sixth of the above methods, the film comprises a thermoplastic film which is an amorphous film.

In another preferred embodiment of any of the above methods, the film comprises a vinyl polymer. More preferably, the film comprises a polyolefin. Still more preferably, the film comprises polyethylene or polypropylene.

In another preferred embodiment of any of the above methods, the film comprises polypropylene, and the film is stretched to a final area stretch ratio of at least 16:1. More preferably, the film is stretched to a final area stretch ratio of from 25:1 to 100:1.

In another preferred embodiment of any of the above methods, the film comprises polypropylene, and the film is heated to from 120 to 165° C. More preferably, the film is heated to from 150 to 165° C.

In another preferred embodiment of any of the above methods, the film comprises polypropylene, the film is heated to from 120 to 165° C., and the cooling includes forcing cooling air onto the film. The cooling air is at least 5° C. cooler than the film.

Certain terms are used in the description and the claims that, while for the most part are well known, may require some explanation. "Biaxially stretched," when used herein to describe a film, indicates that the film has been stretched in two different directions, a first direction and a second direction, in the plane of the film. Typically, but not always, the two directions are substantially perpendicular and are in the machine direction ("MD") of the film and the transverse direction ("TD") of the film. Biaxially stretched films may be sequentially stretched, simultaneously stretched, or stretched by some combination of simultaneous and sequential stretching. "Simultaneously biaxially stretched," when used herein to describe a film, indicates that significant portions of the stretching in each of the two directions are performed simultaneously. Unless context requires otherwise, the terms "orient," "draw," and "stretch" are used interchangeably throughout, as are the terms "oriented," "drawn," and "stretched," and the terms "orienting," "drawing," and "stretching."

The term "stretch ratio," as used herein to describe a method of stretching or a stretched film, indicates the ratio of a linear dimension of a given portion of a stretched film to the linear dimension of the same portion prior to stretching. For example, in a stretched film having an MD stretch ratio of 5:1, a given portion of unstretched film having a 1 cm linear measurement in the machine direction would have 5 cm measurement in the machine direction after stretching. In a stretched film having a TD stretch ratio of 5:1, a given portion of unstretched film having a 1 cm linear measurement in the transverse direction would have 5 cm measurement in the transverse direction after stretching.

"Area stretch ratio," as used herein, indicates the ratio of the area of a given portion of a stretched film to the area of the same portion prior to stretching. For example, in a biaxially stretched film having an area stretch ratio of 50:1, a given 1 $cm^2$ portion of unstretched film would have an area of 50 $cm^2$ after stretching.

The mechanical stretch ratio, also known as nominal stretch ratio, is determined by the unstretched and stretched dimensions, and can typically be measured at the film grippers at the edges of the film used to stretch the film in the particular apparatus being used. Global stretch ratio refers to the overall stretch ratio of the film after the portions that lie near the grippers, and thus are affected during stretching by the presence of the grippers, have been removed from consideration. The global stretch ratio can be equivalent to the mechanical stretch ratio when the input unstretched film has a constant thickness across its full width (from gripper to gripper, crossweb) and when the effects of proximity to the grippers upon stretching are small. More typically, however, the thickness of the input unstretched film is adjusted so as to be thicker or thinner near the grippers than at the center of the film. When this is the case, the global stretch ratio will differ from the mechanical or nominal stretch ratio. These global or mechanical ratios are both to be distinguished from a local stretch ratio. The local stretch ratio is determined by measuring a particular portion of the film (for example a 1 cm portion) before and after stretching. When stretching is not uniform over substantially the entire edge-trimmed film, then the local ratio can be different from the global ratio. When stretching is substantially uniform over substantially the entire film (excluding the area immediately near the edges and surrounding the grippers along the edges), then the local ratio everywhere will be substantially equal to the global ratio. Unless the context requires otherwise, the terms first direction stretch ratio, second direction stretch ratio, MD stretch ratio, TD stretch ratio, and area stretch ratio are used herein to describe the global stretch ratio.

The term "stretch profile" is meant to refer collectively to the values of all the variables of stretching the film, including overall throughput rate of the tenter, and the stretch ratios and temperatures as a function of position in the process, and to the techniques used to attain these values, such as air impingement velocities, clip accelerations and the like.

BRIEF DESCRIPTION OF THE DRAWINGS

The present invention will be further explained with reference to the appended Figures, wherein.

DETAILED DESCRIPTION OF THE INVENTION

Figure 1:
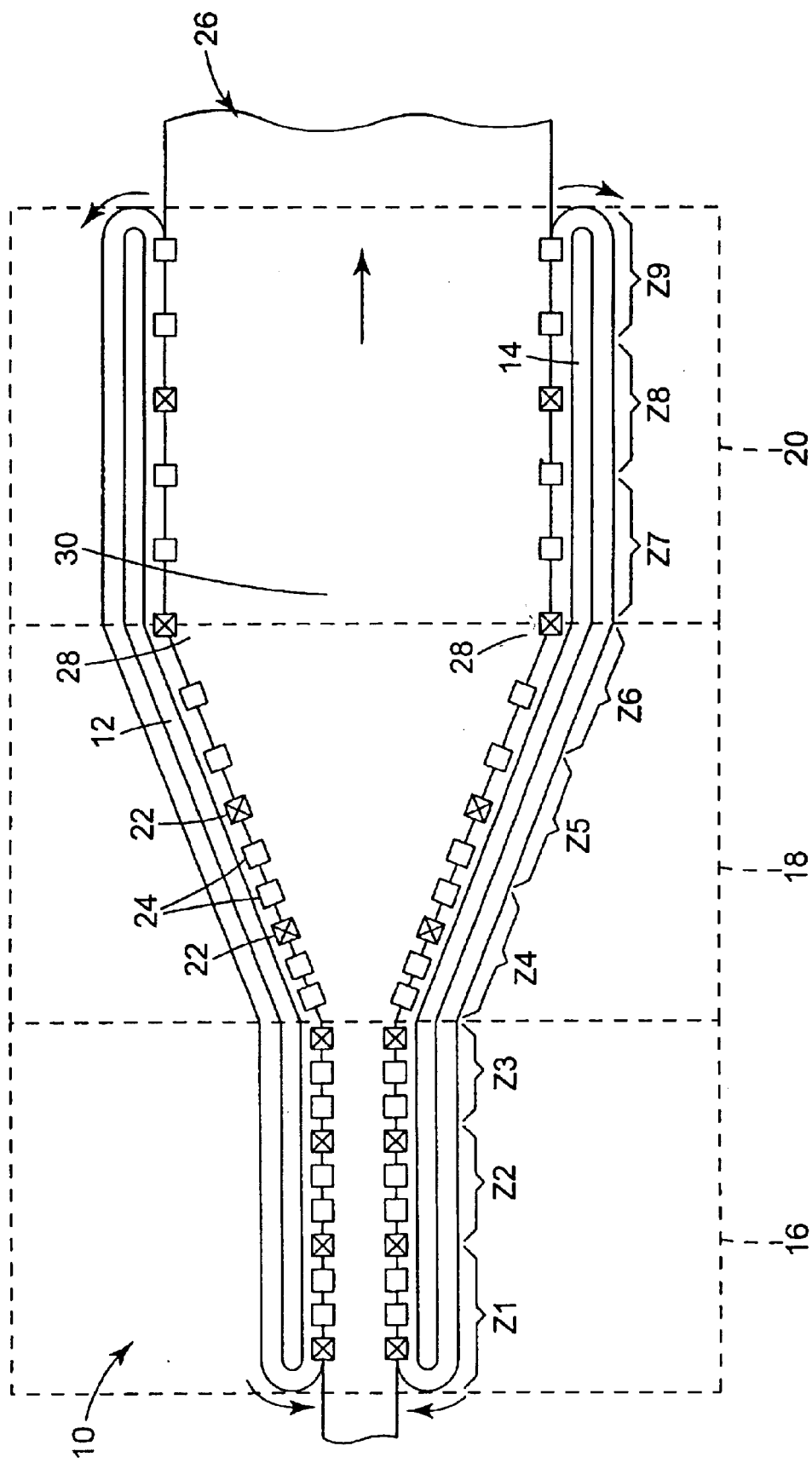
FIG. 1 is a top schematic view of a tenter apparatus for use with the present invention.

FIG. 1 illustrates a top schematic view of a tenter apparatus for carrying out the methods of the present invention. The tenter is preferably of the type disclosed in U.S. Pat. No. 5,051,225, "Method of Drawing Plastic Film in a Tenter Frame," Hommes et al., the entire contents of which are incorporated herein. Tenter apparatus 10 includes a first side rail 12 and a second side rail 14 on which the driven clips 22 and idler clips 24 ride. In FIG. 1, the driven clips 22 are illustrated schematically as boxes marked "X" while the idler clips 24 are illustrated schematically as open boxes. Between pairs of driven clips 22 on a given rail, there are one or more idler clips 24. As illustrated, there are two idler clips 24 between each pair of clips 22 on a given rail. One set of clips 22, 24 travels in a closed loop about first rail 12 in the direction indicated by the arrows at the ends of the rail. Similarly, another set of clips 22, 24 travels in a closed loop about second rail 14 in the direction indicated by the arrows at the ends of the rail. The clips 22, 24 hold the film edges and propel film 26 in the direction shown by the arrow at the center of the film. At the ends of the rails 12, 14, the clips 22, 24 release the film 26. The clips then return along the outside of the rails to the entrance of the tenter to grip the cast web to propel it through the tenter. (For clarity of illustration, the clips returning to the entrance on the outside of the rails have been omitted from FIG. 1.) The stretched film 26 exiting the tenter may be wound up for later processing or use, or may be further processed before winding.

The polymer can be cast into sheet form as is known in the art, to prepare a web suitable for stretching to arrive at the preferred film described herein. The web can be a homopolymer, copolymer, blend, monolayer, or multilayer, as is known in the art. When making polypropylene films, a suitable method for casting a web is to feed the resin into the feed hopper of a single screw, twin screw, cascade, or other extruder system having extruder barrel temperatures adjusted to produce a stable homogeneous melt. The polypropylene melt can be extruded through a sheet die onto a rotating cooled metal casting wheel. Optionally, the casting wheel can be partially immersed in a fluid-filled cooling bath, or, also optionally, the cast web can be passed through a fluid-filled cooling bath after removal from the casting wheel. The web is then biaxially stretched according to the preferred methods described herein. The extruded web is typically quenched, optionally re-heated by passing through an infrared heater, and fed to the clips 22, 24 on the first and second rails 12, 14, to be propelled through the tenter apparatus 10. The optional infrared heating and the gripping by the clips 22, 24 may occur in any order or simultaneously.

The rails 12, 14 pass through three sections: preheat section 16; stretch section 18; and post-stretch treatment section 20. In the preheat section 16, the film is heated to within an appropriate temperature range to allow a significant amount of stretching without breaking. The three functional sections 16, 18, 20 may be broken down further into zones. For example, in one preferred embodiment of a tenter, the preheat section 16 includes zones Z1, Z2, and Z3, the stretch section 18 includes zones Z4, Z5, and Z6, and the post-stretch treatment section 20 includes zones Z7, Z8, and Z9. It is understood that the preheat, stretch, and post-treatment sections may each include fewer or more zones than illustrated. Further, within the stretch section 18, the TD component of stretch or the MD component of stretch may be performed in the same or in different zones. For example, MD and TD stretch each may occur in any one, two or three of the zones Z4, Z5, and Z6. Further, one component of stretch may occur before the other, or may begin before the other and overlap the other. Still further, either component of stretch may occur in more than one discrete step. For example, MD stretch may occur in Z4 and Z6 without any MD stretch occurring in Z5.

Some stretching in the MD and/or TD may also occur in the preheat section or post-stretch treatment section. For example, in the embodiment illustrated, stretching may begin in Zone 3. Stretching may continue into Zone 7 or beyond. Stretching may resume in any of the Zones after Zones Z4, Z5, or Z6.

In one preferred stretch profile, the film is stretched to an MD stretch ratio of at least 2:1 and a TD stretch ratio of at least 2:1. The final stretch ratios may be selected to provide films having desired characteristics and properties.

In one preferred stretch profile, simultaneous biaxial stretching occurs in the stretch section 18. For example, TD stretch occurs throughout zones Z4, Z5 and Z6. For this to occur, the first and second rails 12, 14 are configured to diverge through each of these zones. In this stretch profile, MD stretch preferably occurs only in zone Z4. For this to occur, the driven clips 22 are accelerated through zone Z4 so as to induce MD stretch, and then the spacing of the driven clips 22 is maintained substantially constant in the MD through zones Z5 and Z6. In another preferred stretch profile, MD stretch occurs in zones Z4 and Z5, while TD stretch occurs in zones Z4, Z5, Z6. In yet another preferred stretch profile, both MD and TD stretch occur in zones Z4, Z5, and Z6.

In another preferred stretch profile, sequential biaxial stretching occurs. For MD stretch to precede TD, the rails 12, 14 can remain parallel in zone Z4 while the driven clips 22 accelerate in the MD. The rails 12, 14 then diverge in either or both of zones Z5 and Z6 for TD stretch while the MD spacing of the driven clips 22 remains substantially constant in these zones. For TD to precede MD, the rails 12, 14 diverge initially with no or little MD stretch, and then remain parallel while MD stretch occurs.

Usually the film 26 is then propelled through the post-stretch treatment section 20. In this section, the film 26 typically is maintained at a desired temperature while no significant stretching occurs. This treatment is often referred to as a heat set or anneal, and is performed to improve the properties of the final film, such as the dimensional stability. Alternatively, a small amount of relaxation in either or both of the MD and TD may occur in the post-stretch treatment section 20. Relaxation here refers to a convergence of the rails in the TD and/or a convergence of the driven clips on each rail in the MD.

Biaxial stretching of films is sensitive to many process conditions, including but not limited to the composition of the resin, film casting and quenching parameters, the time-temperature history while preheating the film prior to stretching, the stretching temperature used, the stretch profile used, and the rates of stretching. With the benefits of the teachings herein, one of skill in the art may adjust any or all of the parameters and thereby obtain films having desired properties and characteristics.

Some preferred stretching conditions are as follows for polypropylene film. Cast web thickness is preferably from about 0.2 to 12 mm, more preferably from about 1 to 3 mm.

The temperature of the IR heat source is high enough to impart the desired pre-heating to the cast web. The air temperature in the preheat section 16 is preferably about 170 to 220° C. The air temperature in the stretch section 18 and post-stretch treatment section 20 is preferably about 150 to 170° C. The film itself in stretch section 18 is preferably approximately 120 to 165° C. to allow significant stretching to occur without breaking, more preferably approximately 150 to 165° C. For polypropylene, final area stretch ratio is at least 16:1; more preferably from about 25:1 to 100:1. The MD stretch ratio and TD stretch ratio are selected as desired, and may or may not be equal to each other.

The cooling of the present invention, whether edge cooling or zone cooling, may begin before or after the onset of stretching in the stretch section 18. If cooling begins before the onset of stretching, it should continue after the onset of stretching into the stretch section 18. As used herein, including the claims, the phrase, "imparting a machine direction cooling gradient to at least a portion of the width of the stretched film" means imparting a temperature gradient such that the film is cooler at the forward side of the cooled film portion and warmer at the rearward side of the cooled film portion. "Forward" means the direction of film travel in the machine direction and "rearward" is opposite to the direction of film travel in the machine direction. By stating that the gradient is applied to at least a portion of the "stretched film," this means the gradient is present after stretching begins. The gradient may in addition be present prior to the onset of stretching provided the gradient continues to be imparted, or is re-imposed, after stretching begins. The gradient may be imparted to the stretched film at any location of the stretch section and/or just after the stretch section. Preferably, the cooling, and therefore the gradient, begins at, or continues at least until, the end of the stretch section 18 or the beginning of the post-stretch treatment section 20. In one preferred embodiment, the cooling occurs at the latter portion of the stretch section 18 and in the beginning of the post-stretch section 20. This would be, for example, in zones Z6 and Z7 for the embodiment illustrated in FIG. 1. In another preferred embodiment, cooling occurs at the latter portion of the stretch section 18. For example, cooling can occur in either or both of zones Z5 and Z6 in the apparatus illustrated in FIG. 1, or in the second half of zone Z4 and throughout zones Z5 and Z6. In another preferred embodiment, cooling occurs throughout the stretch section 18, for example in zones Z4, Z5, and Z6 of the tenter of FIG. 1. In another preferred embodiment, cooling can occur at the beginning of the post-stretch section 20, such as in either or both of zones Z7 and Z8. If the MD stretching and TD stretching zones do not coincide with one another, then in one preferred embodiment, cooling occurs in both the MD and the TD stretching zones. In another preferred embodiment, cooling occurs at the MD stretching zones only.

Cooling is provided to at least a portion of the width of the film 26. Preferably, cooling is provided by actively cooling either: i) the edge portions 28 of the film in a zone or zones; or ii) the full width, including the edge portions 28 and the center portion 30, of the film in a zone or zones. In one preferred stretch profile, at the onset of stretching, the edge portions of the film are maintained no hotter than the center portion of the film. This may be continued throughout the stretching process.

Preferably, cooling is provided by forced air convection. The cooling air must be cooler than the temperature of the film at the location the air is provided. Preferably, the cooling air is provided at a temperature and flow rate effective to cool the film by at least 3° C., more preferably 5° C., and still more preferably 10° C. The difference of the temperature of the cooling air and that of the film to be cooled is called the air temperature differential and should be at least 5° C., and may be significantly greater. The difference of the temperature of the film with and without cooling is called the target film temperature differential. Usually, due to the nature of heat transfer, the edge air or zone air temperature differential is greater than the target film temperature differential. The cooling imparts a temperature drop in the film in the machine direction such that, when viewed from a location upon the film, the film is cooler in the direction of film travel than in the direction opposite film travel. The preferred temperature of the cooling air will depend on factors such as film temperature, thickness, speed, and heat transfer characteristics of the tenter. The temperature and location of the cooling air can be selected by one of skill in the art with reference to the teachings of the present invention to obtain the desired improvements disclosed herein.

The cooling is provided at a location and temperature effective to improve uniformity of the spacing of the idler clips and driven clips compared to the spacing obtained at otherwise identical conditions without such cooling. Spacing uniformity is determined as follows. The spacing between the clips can be determined, for example, by measurements on the stretched film 26. The ideal clip spacing is defined, for a system with two idler clips between each pair of driven clips on each rail, as one-third of the spacing between successive driven clips $D_1$ (forward — toward the tenter exit) and $D_2$ (rearward —toward the tenter entrance). If there are N idler clips between driven clips $D_1$ and $D_2$, each nearest-neighbor pair of clips, $D_1$-$I_1$, $I_1$-$I_2$, . . . through $I_N$-$D_2$, should have an ideal spacing of $1/(N+1)$ of the distance D1–D2. A numerical value for the non-uniformity of the spacing can be obtained by measuring the actual pairwise spacings obtained, subtracting from the measured spacing of each nearest-neighbor pair the ideal spacing, taking the absolute value of each difference, and summing. Ideal spacing, therefore, will give a value for spacing non-uniformity of zero. Larger values represent increasing spacing non-uniformity. An improvement in spacing uniformity will manifest as a decrease in the value of the spacing non-uniformity. Preferably, spacing non-uniformity is decreased by at least 5% of what it would have been without the cooling. More preferably, non-uniformity is decreased by at least 10%, and still more preferably by at least 50%. Alternatively, cooling is provided at a location and temperature effective to provide that the clip spacing of each nearest-neighbor pair is within 20% of ideal, more preferably within 10% of ideal, and most preferably within 5% of ideal. In one preferred embodiment using polypropylene, when the tenter temperature is set to approximately 160 to 165° C., cooling air for edge cooling is approximately 30 to 140° C., more preferably about 65 to 120° C., and still more preferably about 70 to 110° C. In one preferred zone cooling embodiment using polypropylene, when the tenter temperature is set to approximately 160 to 165° C., cooling air is approximately 100 to 150° C., more preferably about 120 to 140° C., and still more preferably about 125 to 130° C. With the benefits of the teachings herein, one of skill in the art can select edge cooling and zone cooling parameters for other materials, thicknesses, film speeds, tenter temperatures, and other stretch profiles.

In another preferred stretch profile, cooling is provided to at least a portion of the width of the film in an effective amount to reduce the value of idler clip lag from the value of idler clip lag obtained at otherwise identical conditions in the absence of said cooling. Clip lag values are determined as follows. The spacing between the clips can be determined, for example, by measurements on the stretched film 26. The ideal clip spacing is defined, for a system with two idler clips between each pair of driven clips on each rail, as one-third of the spacing between successive driven clips $D_1$ (forward —toward the tenter exit) and $D_2$ (rearward —toward the tenter entrance). Idler clip $I_1$ is the forward of the two idler clips between driven clips, and idler clip 12 is the rearward of the two. The values for pairs $D_1$-$I_1$, $I_1$-$I_2$, and $I_2$-$D_2$, as percent variations in spacing from ideal (with respect to the ideal) are calculated, with positive numbers indicating spacings farther than ideal, and negative numbers indicating spacings closer than ideal. $D_1$-$I_1$ indicates the percent spacing variation from ideal between the forward driven and forward idler clips, $I_1$-$I_2$ is the percent spacing variation from ideal between idler clips, and $I_2$-$D_2$ the spacing variation from ideal between the rear idler clip and the rear driven clip. The total clip lag value reported is calculated as the percent variation from ideal spacing for $D_1$-$I_1$, minus the percent variation from ideal for $I_2$-$D_2$. This calculation can be extended to cases with differing numbers of idler clips between each pair of driven clips. For the case of only one idler clip between each pair of driven clips, $I_1$, equals $I_2$, and the calculation outlined above may proceed on that basis. For the case of N>2 idler clips, $I_2$ in the formulation above becomes $I_N$, and the calculation may proceed on that basis. Spacings between any two idler clips are ignored in the calculation of idler clip lag regardless of the number of idlers present.

Preferably, idler clip lag is decreased by at least 5% of what it would have been at otherwise identical conditions without the cooling. More preferably, idler clip lag is decreased by at least 10%, and still more preferably by at least 50%. Alternatively, cooling is provided at a location and temperature effective to provide that the value of idler clip lag is less than about 20%, more preferably less than about 10%, and most preferably less than about 5%.

A negative value for clip lag, thus defined, is indicative of clip lead. Preferably, clip lag approaches zero. In some cases, it may be preferable to impart clip lead. As used herein, including the claims, the phrase, "reduce the value of idler clip lag" is meant to indicate that the value will be made either a smaller positive number, zero, or any negative number (clip lead). To denote specifically an approach toward the ideal (uniform) clip separation, the phrase "reduce the absolute value of idler clip lag" will be used.

In another preferred stretch profile, cooling is provided to at least a portion of the width of the film in an effective amount to improve the caliper uniformity relative to the caliper uniformity obtained at otherwise identical conditions in the absence of the cooling. Caliper uniformity may be measured either across the web, e.g. from clip face to clip face, or down the web, e.g. along the direction of film travel. Either or both of the crossweb and downweb caliper uniformity may be improved. The non-uniformity may be characterized by the standard deviation from the mean of a caliper scan along a given direction. Alternatively, the maximum peak to valley height of a caliper scan along a given direction may be used. A perfectly uniform film would have a non-uniformity of zero. A variety of caliper measuring techniques may be used. Typically, the higher the resolution, the better. A preferred measurement technique is to cut crossweb or downweb strips and then scan the caliper using a PC 5000 Electronic Thickness Gauge available from Electro-Gauge Inc., located in Eden Prairie, Minn., USA.

Crossweb uniformity may also be characterized by comparing a series of downweb-cut strips cut along "lanes" differing in crossweb position.

Figure 2:
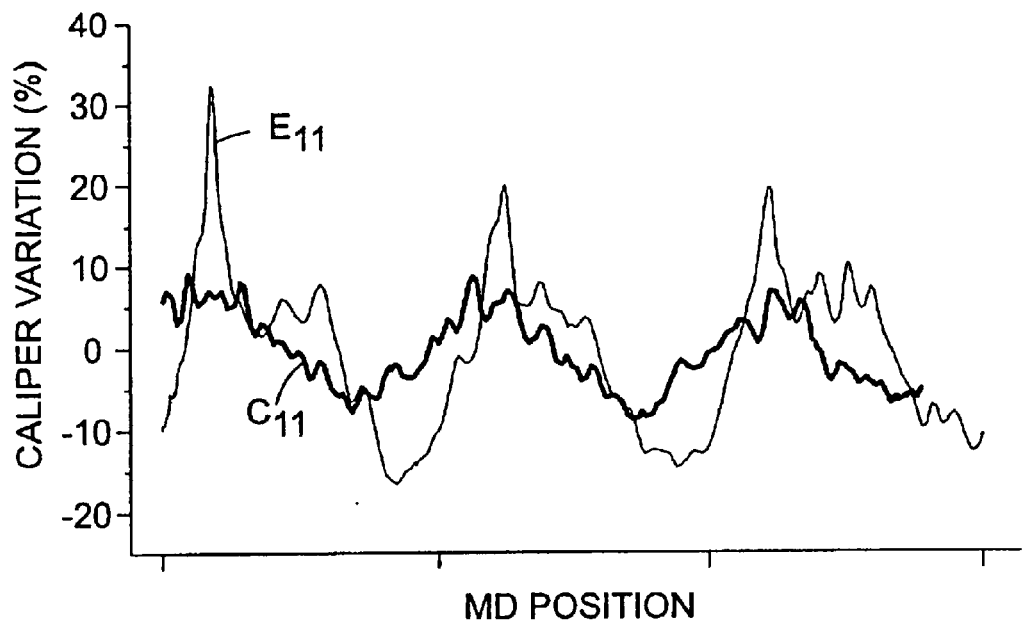
FIG. 2 is a plot of the caliper variation as a function of MD position for a center-sample and an edge-sample of the film of Example 11.

FIG. 2 presents such a pair of caliper scans. The marks on the MD Position axis represent the positions of the driven clips relative to the film samples. The data of FIG. 2 is taken from a film made in a process with two idler clips between each pair of driven clips according to Example 11 below. The edge lane (plot $E_{11}$) was located about 16% of the way across the film from a clip face whereas the center lane (plot $C_{11}$) was 50% of the way across the film (centered). Total clip lag was measured as 58%. FIG. 2 shows that there is a relationship between caliper non-uniformity and clip lag. The caliper non-uniformity is periodic with a "wavelength" roughly equal to the final separation of the driven clips. FIG. 2 also shows that the magnitude of caliper non-uniformity decreases from the edge of the film near the clips towards the center of the film. A downweb strip cut along a lane near the edge has higher non-uniformity than a downweb strip cut along a lane near the center, though the periodic nature of the caliper fluctuation remains. Increasing the initial web width may increase the width of a central portion with relatively low non-uniformity; nevertheless, clip lagging will occur in films having lower yield (the fraction of the width which is usable width).

Figure 3:
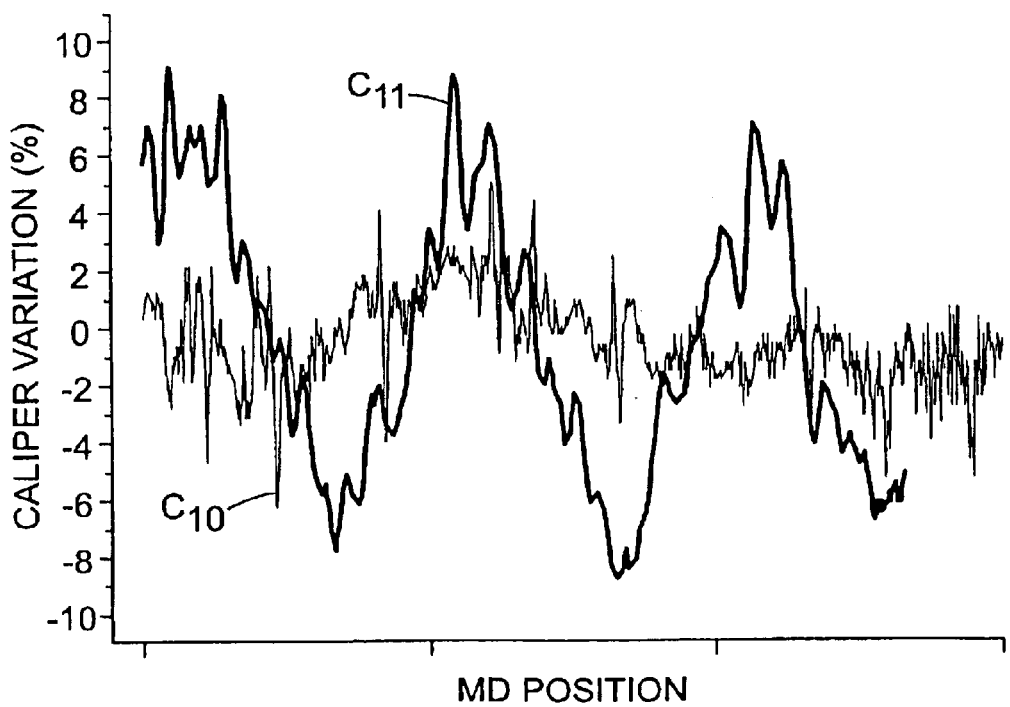
FIG. 3 is a plot of the caliper variation as a function of MD position for the center-samples of the film of Example 11 and the film of Example 10.

FIG. 3 shows that the non-uniformity decreases for center lanes with decreasing clip lagging. Therefore, reduced clip lagging, or variation from the ideal clip spacing, is observed in more uniform films and/or in films in which a larger portion of the width has good uniformity, thereby increasing the yield for a given caliper uniformity specification. Caliper traces shown represent 58% lagging (plot $C_{11}$, of Example 11 below) and less than 2% lagging (plot $C_{10}$, of Example 10 below). Plot $C_{10}$ of Example 10 does not show the same periodicity based on driven-clip separations. Clip position does not correlate strongly with caliper non-uniformity in this example with low values of clip lag and caliper non-uniformity.

It will be readily appreciated that idler clip lagging, or any non-uniformity of clip spacing, occurs when there is downweb caliper non-uniformity. Typical polymeric films drawn above the glass transition temperature are nearly volume preserving, except through voiding or via densification due to crystallization, so that the decrease in thickness is approximately proportional to the product of the local principal draw ratios, e.g. the local crossweb and downweb draw ratios. The present invention also recognizes the link between caliper and draw ratio nonuniformities and non-uniformity of other properties both crossweb and downweb. These physical, mechanical and optical properties include but are not limited to elastic moduli, tensile strength, elongation at break, energy-to-break per unit volume and other tear and dispensing properties, surface characteristics, interlayer adhesion in multilayer films, coefficients of thermal and hygroscopic expansion, heat shrinkage, refractive indices, capacitance and other dielectric properties, haze, transparency, color, spectral band edges, and other optical measures of appearance and performance. By dispensing properties is meant the properties relating to the ease of severing and the quality of severed edge when a film, converted into the form of a tape, is dispensed using a dispenser having a cutting edge. The level of non-uniformity of these various properties may be related to the caliper fluctuations and clip lag, for example, through differing sensitivities of these properties to the local caliper and local draw ratios. Thus, lagging is symptomatic of a downweb draw ratio fluctuation which causes both a downweb caliper fluctuation and a downweb modulus of elasticity fluctuation. Caliper may fluctuate differently than modulus because of corresponding partial compensation of the thickness by concomitant crossweb draw ratio fluctuations under certain conditions as well as the nonlinear relationship between moduli and draw ratios.

Although the present invention is described herein with particular applicability to methods of biaxially stretching films and to resulting biaxially stretched films, the present invention may also be applied advantageously to methods of stretching films in a single direction under conditions in which the film is held by clips, and the clips are separated along the machine direction, and thus capable of producing idler clip lagging or leading. In one such method, the film is stretched solely along the machine direction thus separating the clips along the machine direction and creating the possibility of clip lagging. In another example, the clips begin the draw with some MD separation, and then stretching in the transverse direction, for example, may create non-uniformity in the MD clip spacing.

The methods of stretching with appropriate cooling described herein are well suited for use on films including a polymeric film. Preferably, the film comprises a thermoplastic polymer. For a film having more than one layer, the description of suitable materials which follows need apply only to one of the layers. Suitable polymeric film materials for use in the current invention include thermoplastics capable of being formed into biaxially oriented films. Suitable thermoplastic polymer film materials include, but are not limited to, polyesters, polycarbonates, polyarylates, polyamides, polyimides, polyamide-imides, polyetheramides, polyetherimides, polyaryl ethers, polyarylether ketones, aliphatic polyketones, polyphenylene sulfide, polysulfones, polystyrenes and their derivatives, polyacrylates, polymethacrylates, cellulose derivatives, polyethylenes, aliphatic and cycloaliphatic polyolefins, copolymers having a predominant olefin monomer, fluorinated polymers and copolymers, chlorinated polymers, polyacrylonitrile, polyvinylacetate, polyvinylalcohol, polyethers, ionomeric resins, elastomers, silicone resins, epoxy resins, and polyurethanes. Miscible or immiscible polymer blends including any of the above-named polymers, and copolymers having any of the constituent monomers of any of the above-named polymers, are also suitable, provided a biaxially oriented film may be produced from such a blend or copolymer.

Preferred among thermoplastics are the vinyl polymers, by which is meant all polymers of the general formula -[CWX-CYZ]$_n$-, where W, X, Y, and Z are either hydrogen (H) or any substituent atoms or groups. Thus within the preferred vinyl polymer class we include the tetrasubstituted, trisubstituted, 1,2-disubstituted and 1,1-disubstituted polymers (including the "vinylidene" polymers) as well as the more common monosubstituted vinyl polymers. Examples include the polyolefins, polyvinyl chloride, polyvinyl fluoride, polyvinylidene chloride, polyvinylidene fluoride, polytrifluoroethylene, polychlorotrifluoroethylene, polyvinyl acetate, polyvinyl alcohol, polyacrylic acid and its esters, polyacrylonitrile, and polymethacrylic acid and its esters (such as polymethyl methacrylate).

More preferred are the polyolefins, by which is meant all polymers of the general formula -[CH$_2$CR$^1$R$^2$]$_n$-, where R$^1$ and R$^2$ are saturated or unsaturated, linear or branched alkyl, cycloalkyl, or aryl groups, or hydrogen. Included are such polymers as polyethylenes, polypropylenes, polybutene-1, poly-(4-methylpentene-1), polyisobutene, poly-(vinylcyclohexane), polybutadienes, and polystyrene and its ring- and alpha-substituted derivatives.

Still more preferred are polyethylene and the saturated alkyl or cycloalkyl polyolefins. Polypropylene is most preferred.

The methods of stretching with appropriate cooling described herein are well suited for use on films including amorphous or semi-crystalline thermoplastic polymeric films. Amorphous thermoplastics include, but are not limited to, polymethacrylates, polycarbonates, atactic polyolefins and random copolymers. Semi-crystalline thermoplastics include, but are not limited to, polyesters, polyamides, thermoplastic polyimides, polyarylether ketones, aliphatic polyketones, polyphenylene sulfide, isotactic or syndiotactic polystyrene and their derivatives, polyacrylates, polymethacrylates, cellulose derivatives, polyethylene, polyolefins, fluorinated polymers and copolymers, polyvinylidene chloride, polyacrylonitrile, polyvinylacetate, and polyethers.

Semicrystalline thermoplastics from which biaxially oriented films may be produced are sometimes characterized in terms of their degree of crystallinity at various stages in the film-making process. Thus, polyethylene terephthalate (PET), a common polymer for biaxially oriented film, is well-known to be quenchable when cast into a film. That is, PET crystallizes slowly enough that it can be extruded onto a chilled roll and thereby cooled below its glass transition temperature sufficiently quickly to prevent the formation of measurable amounts of crystallinity. It is well known that such quenching is advantageous for the production of biaxially oriented PET film, both because it enables the stretching step(s) to take place at temperatures only slightly above the glass transition, and because it allows a significant amount of stretching without breaking, which breaking is prevalent if a more brittle semicrystalline cast web is allowed to form.

The degree of crystallinity of a semicrystalline polymer film is difficult to precisely quantify, as it depends not only on the assumption of a two-phase model (crystalline and amorphous) for polymer morphology which may or may not be precisely accurate, but also on the assumption of the constancy of some measurable property (density, for example) for each phase regardless of such variables as degree of orientation. Different measurement techniques frequently provide different results due to the inadequacies of these assumptions. Thus, precise agreement among workers is not to be expected, especially where different techniques have been employed. Techniques well-known in the art for estimating the degree of crystallinity include density, differential scanning calorimetry (DSC), average refractive index (through its relationship to the density), analysis of infrared bands, and X-ray methods.

Usually, the degree of crystallinity of PET in the form of unstretched cast film is reported to be undetectably low, or 0%, or below 1%. This is typically referred to as an amorphous cast web. In a simultaneous biaxial orientation process, film of this low degree of crystallinity would be fed to the tenter. In the more commonly employed sequential process, however, such an amorphous film is first stretched in the machine direction using heated rolls rotating at different speeds. Such "length orientation" imparts some crystallinity to the film, the degree of which has been reported at anywhere from 7% to 30%. See LeBourvellec and Beautemps, *J. Appl. Polym. Sci.* 39, 329–39 (1990); and Faisant de Champchesnel, et al., *Polymer* 35(19), 4092–4102 (1994). Typical values in commercial practice range from 10–20%. See Encycl. Of Polym. Sci. & Engrg., vol. 12, Wiley (NY) 1988, pg. 197. In a sequential process, it is film of this degree of crystallinity which would be fed to the tenter. Transverse direction stretching in the tenter has been reported to increase the degree of crystallinity to within the range of 17% to 40%. Subsequent heat-setting or annealing under transverse constraint in the tenter is reported to further increase the degree of crystallinity to about 45% to 50%. The breadth of the range reported for pre-heatset film is due both to the range of crystallinities of the length-oriented films provided as input to that step of the process, and to the experimental difficulty of decoupling the transverse direction stretching step from the heat-setting step, both of which occur within the tenter oven. Considerably less is known regarding the behavior of PET in a simultaneous biaxial orientation process, but the available data places the degrees of crystallinity after stretching and after heat-setting in the same ranges as those for the sequential process after TD stretching and after heat-setting.

Another polyester suitable for use with the present invention is polyethylene naphthalate (PEN). PEN is known to crystallize somewhat more slowly than PET. Nonetheless, reports of its behavior in tenter-film processes place the degrees of crystallinity at the end of each process step in roughly the same ranges as those reported for PET. Thus, when processed conventionally, PEN too is an example of an amorphous cast web.

In contrast to the polyesters, polypropylene (PP) crystallizes so rapidly that it is almost impossible to quench the molten polymer to less than 50% crystallinity with any practical commercial method. See The Science and Technology of Polymer Films, Vol. II, by Orville J. Sweeting, Wiley (NY), 1971, pg. 223. As a result, PP is stretched at temperatures just below the crystalline melting point, rather than at temperature just above the glass transition as is the case for the polyesters. Some additional crystallinity develops during the process, but the amount is small. One comprehensive study found the degrees of crystallinity of PP cast (unstretched) film, length-oriented film, and sequentially biaxially oriented film to be 58%, 62% and 70%, respectively. See A. J. deVries, *Pure Appl. Chem.* 53, 1011–1037 (1981). The Encyclopedia of Polym. Sci. & Engrg., Vol. 7, Wiley (NY), 1987, pg. 80, reports the degree of crystallinity of typical biaxially oriented PP films at 65–70%.

The methods of stretching with appropriate cooling described herein are well suited for use on films including semicrystalline thermoplastic polymer films. Preferred semicrystalline thermoplastic polymers are those which can undergo a significant amount of stretching without breaking when the film entering the tenter inlet has a degree of crystallinity greater than about 1%. Such films are referred to herein as pre-crystallized polymeric films. More preferred semicrystalline thermoplastic polymers are those which can be effectively biaxially stretched without breaking when the film entering the tenter inlet has a degree of crystallinity greater than about 7%. Still more preferred semicrystalline thermoplastic polymers are those which can be effectively biaxially stretched without breaking when the film entering the tenter inlet has a degree of crystallinity greater than about 30%. Even more preferred semicrystalline thermoplastic polymers are those which can be effectively biaxially stretched without breaking when the film entering the tenter inlet has a degree of crystallinity greater than about 50%. Polypropylene is most preferred.

For the purposes of the present invention, the term "polypropylene" is meant to include copolymers having at least about 90% propylene monomer units, by weight. "Polypropylene" is also meant to include polymer mixtures having at least about 65% polypropylene, by weight. Polypropylene for use in the present invention is preferably predominantly isotactic. Isotactic polypropylene has a chain isotacticity index of at least about 80%, an n-heptane soluble content of less than about 15% by weight, and a density between about 0.86 and 0.92 grams/cm$^3$ measured according to ASTM D1505-96 ("Density of Plastics by the Density-Gradient Technique"). Typical polypropylenes for use in the present invention have a melt flow index between about 0.1 and 15 grams/ten minutes according to ASTM D1238-95 ("Flow Rates of Thermoplastics by Extrusion Plastometer") at a temperature of 230° C. and force of 21.6 N, a weight-average molecular weight between about 100,000 and 400,000, and a polydispersity index between about 2 and 15. Typical polypropylenes for use in the present invention have a melting point as determined using differential scanning calorimetry of greater than about 130° C., preferably greater than about 140° C., and most preferably greater than about 150° C. Further, the polypropylenes useful in this invention may be copolymers, terpolymers, quaterpolymers, etc., having ethylene monomer units and/or alpha-olefin monomer units having between 4–8 carbon atoms, said comonomer(s) content being less than 10% by weight. Other suitable comonomers include, but are not limited to, 1-decene, 1-dodecene, vinylcyclohexene, styrene, allylbenzene, cyclopentene, norbornene, and 5-methylnorbornene. One suitable polypropylene resin is an isotactic polypropylene homopolymer resin having a melt flow index of 2.5 g/10 minutes, commercially available under the product designation 3374 from FINA Oil and Chemical Co., Dallas, Tex. Recycled or reprocessed polypropylene in the form, for example, of scrap film or edge trimmings, may also be incorporated into the polypropylene in amounts less than about 60% by weight.

As already mentioned, mixtures having at least about 65% isotactic polypropylene and at most about 35% of another polymer or polymers may also be advantageously used in the process of the present invention. Suitable additional polymers in such mixtures include, but are not limited to, propylene copolymers, polyethylenes, polyolefins having monomers having from four to eight carbon atoms, and other polypropylene resins.

Polypropylene for use in the present invention may optionally include 140% by weight of a resin, of synthetic or natural origin, having a molecular weight between about 300 and 8000, and having a softening point between about 60° C. and 180° C. Typically, such a resin is chosen from one of four main classes: petroleum resins, styrene resins, cyclopentadiene resins, and terpene resins. Optionally, resins from any of these classes may be partially or fully hydrogenated. Petroleum resins typically have, as monomeric constituents, styrene, methylstyrene, vinyltoluene, indene, methylindene, butadiene, isoprene, piperylene, and/or pentylene. Styrene resins typically have, as monomeric constituents, styrene, methylstyrene, vinyltoluene, and/or butadiene. Cyclopentadiene resins typically have, as monomeric constituents, cyclopentadiene and optionally other monomers. Terpene resins typically have, as monomeric constituents, pinene, alpha-pinene, dipentene, limonene, myrcene, and camphene.

Polypropylene for use in the present invention may optionally include additives and other components as is known in the art. For example, the films of the present invention may contain fillers, pigments and other colorants, antiblocking agents, lubricants, plasticizers, processing aids, antistatic agents, nucleating agents, antioxidants and heat stabilizing agents, ultraviolet-light stabilizing agents, and other property modifiers. Fillers and other additives are preferably added in an effective amount selected so as not to adversely affect the properties attained by the preferred embodiments described herein. Typically such materials are added to a polymer before it is made into an oriented film (e.g., in the polymer melt before extrusion into a film). Organic fillers may include organic dyes and resins, as well as organic fibers such as nylon and polyimide fibers, and inclusions of other, optionally crosslinked, polymers such as polyethylene, polyesters, polycarbonates, polystyrenes, polyamides, halogenated polymers, polymethyl methacrylate, and cycloolefin polymers. Inorganic fillers may include pigments, fumed silica and other forms of silicon dioxide, silicates such as aluminum silicate or magnesium silicate, kaolin, talc, sodium aluminum silicate, potassium aluminum silicate, calcium carbonate, magnesium carbonate, diatomaceous earth, gypsum, aluminum sulfate, barium sulfate, calcium phosphate, aluminum oxide, titanium dioxide, magnesium oxide, iron oxides, carbon fibers, carbon black, graphite, glass beads, glass bubbles, mineral fibers, clay particles, metal particles and the like. In some applications it may be advantageous for voids to form around the filler particles during the biaxial orientation process of the present invention. Many of the organic and inorganic fillers may also be used effectively as antiblocking agents. Alternatively, or in addition, lubricants such as polydimethyl siloxane oils, metal soaps, waxes, higher aliphatic esters, and higher aliphatic acid amides (such as erucamide, oleamide, stearamide, and behenamide) may be employed.

Antistatic agents may also be employed, including aliphatic tertiary amines, glycerol monostearates, alkali metal alkanesulfonates, ethoxylated or propoxylated polydiorganosiloxanes, polyethylene glycol esters, polyethylene glycol ethers, fatty acid esters, ethanol amides, mono- and diglycerides, and ethoxylated fatty amines. Organic or inorganic nucleating agents may also be incorporated, such as dibenzylsorbitol or its derivatives, quinacridone and its derivatives, metal salts of benzoic acid such as sodium benzoate, sodium bis(4-tert-butyl-phenyl)phosphate, silica, talc, and bentonite. Antioxidants and heat stabilizers, including phenolic types (such as pentaerythrityl tetrakis [3-(3,5-di-tert-butyl-4-hydroxyphenyl)propionate] and 1,3,5-trimethyl-2,4,6-tris(3,5-di-tert-butyl-4-hydroxybenzyl) benzene), and alkali and alkaline earth metal stearates and carbonates may also be advantageously used. Other additives such as flame retardants, ultraviolet-light stabilizers, compatibilizers, antimicrobial agents (e.g., zinc oxide), electrical conductors, and thermal conductors (e.g., aluminum oxide, boron nitride, aluminum nitride, and nickel particles) may also be blended into the polymer used to form the film.

Resulting films have desirably uniform properties and are well suited for many applications. One preferred application for the film of the present application is as a tape backing. Preferably, the tape backing has a thickness in the range of about 0.020 to about 0.064 mm. The backing is coated with a layer of any suitable adhesive as is known in the art. The backing may have an optional release or low adhesion backsize layer as is known in the art.

The adhesive may be any suitable adhesive as is known in the art. Preferred adhesives are those activatable by pressure, heat or combinations thereof. Suitable adhesives include those based on acrylate, rubber resin, epoxies, urethanes or combinations thereof. The adhesive may be applied by solution, water-based or hot-melt coating methods. The adhesive can include hot melt-coated formulations, transfer-coated formulations, solvent-coated formulations, and latex formulations, as well as laminating, thermally-activated, and water-activated adhesives and bonding agents. Useful adhesives include pressure sensitive adhesives. Pressure sensitive adhesives are well known to possess properties including: aggressive and permanent tack, adherence with no more than finger pressure, and sufficient ability to hold onto an adherend. Examples of useful adhesives include those based on general compositions of polyacrylate; polyvinyl ether, diene rubber such as natural rubber, polyisoprene, and polybutadiene; polyisobutylene; polychloroprene; butyl rubber; butadiene-acrylonitrile polymer; thermoplastic elastomer; block copolymers such as styrene-isoprene and styrene-isoprene-styrene (SIS) block copolymers, ethylene-propylene-diene polymers, and styrene-butadiene polymers; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures or blends (continuous or discontinuous phases) of the above. Additionally, the adhesives can contain additives such as tackifiers, plasticizers, fillers, antioxidants, stabilizers, pigments, diffusing materials, curatives, fibers, filaments, and solvents. Also, the adhesive optionally can be cured by any known method.

A general description of useful pressure sensitive adhesives may be found in Encyclopedia of Polymer Science and Engineering, Vol. 13, Wiley-Interscience Publishers (New York, 1988). Additional description of useful pressure sensitive adhesives may be found in Encyclopedia of Polymer Science and Technology, Vol. 1, Interscience Publishers (New York, 1964).

The film for tape backing may be optionally treated by exposure to flame or corona discharge or other surface treatments including chemical priming to improve adhesion of subsequent coating layers.

The operation of the present invention will be further described with regard to the following detailed examples. These examples are offered to further illustrate the various specific and preferred embodiments and techniques. It should be understood, however, that many variations and modifications may be made while remaining within the scope of the present invention.

EXAMPLES 1–6

The following examples were prepared on a linear motor tenter generally as described in the 225 patent discussed above, which had two idler clips between each pair of driven clips. A continuous polypropylene cast sheet (Fina 3374x, from Fina Chemical, Houston, Tex.) was extruded at a thickness of approximately 0.054 inches (1.4 mm) and a width of 9.6 inches (244 mm), and quenched on a chill roll/water bath system. The film was passed between a set of infrared heaters (IR heater), then into a linear motor tenter oven. The IR heat temperature, oven preheat section temperatures (Zones 1–3), and stretch section temperatures (Zones 4–6) are set forth in Table 1. Web temperature as measured by an IR pyrometer at the entrance to Zone 4 at the beginning of the stretch section is also reported in Table 1. For Examples 1–6, the post-stretch treatment temperatures were as follows: Zone 7: 160° C.; Zones 8 and 9: 165° C. Also, in each of these examples, the final stretch ratios were 7:1 in the MD and 7:1 in the TD. The Zones in which MD stretch occurred (4, 4–5, or 4–6) are reported below. In each of these examples, TD stretch was performed in Zones 4 through 6. All of these stretch profiles were linear with respect to machine position, and include a 10% stretch relaxation in both directions that occurred in Zones 8 and 9. Examples 1–3 had edge cooling air turned off. Examples 4–6 included edge cooling air, and otherwise correspond to Examples 1–3, respectively.

TABLE 1

Stretching Conditions

| Ex. | IR Heat (C.) | Preheat Section Temp. (C.) | | | Stretch Section Temp. (C.) | | | Web Temp. (C.) | MD Stretch Zones | Edge Cool Air Temp. (C.) | |
|---|---|---|---|---|---|---|---|---|---|---|---|
| | | Z1 | Z2 | Z3 | Z4 | Z5 | Z6 | | | Z6 | Z7 |
| 1 | 700 | 185 | 178 | 178 | 165 | 164 | 163 | 144.5 | 4 | — | — |
| 2 | 740 | 192 | 186 | 176 | 162 | 161 | 160 | — | 4–5 | — | — |
| 3 | 680 | 193 | 185 | 180 | 166 | 164 | 163 | 148 | 4–6 | — | — |
| 4 | 700 | 185 | 178 | 178 | 165 | 164 | 163 | 144.1 | 4 | 73.2 | 75.3 |
| 5 | 740 | 192 | 186 | 176 | 162 | 161 | 160 | — | 4–5 | 140.5 | 85.1 |
| 6 | 680 | 193 | 185 | 180 | 166 | 164 | 163 | 148 | 4–6 | 74.4 | 77.8 |

The spacing between the clips was measured on the output film and the idler clip lagging calculated and reported in Table 2. The ideal idler clip spacing is defined as one-third of the spacing between successive driven clips $D_1$ (forward) and $D_2$ (rearward). Idler clip $I_1$ is the forward of the two idler clips between driven clips, and idler clip $I_2$ is the rearward of the two. The values for $D_1$-$I_1$, $I_1$-$D_2$, and $I_2$-$D_2$ in Table 2 are the percent variation in spacing from ideal, with positive numbers indicating a spacing farther than ideal, and negative numbers indicating spacing closer than ideal. $D_1$-$I_1$ indicates the percent spacing variation between the forward driven and forward idler clips, $I_1$-$I_2$ is the percent spacing variation between idler clips, and $I_2$-$D_2$ the spacing variation between the rear idler clip and the rear driven clip. The Total Lag reported is the percent variation from ideal spacing of $D_1$ to $I_1$ minus the percent variation from ideal for $I_2$-$D_2$. The effects of rounding cause some of the values in the "Total" columns In Table 2 to deviate om the differences of the $D_1$-$I_1$ and $I_2$-$D_2$ columns by one unit in the last decimal place. All values are reported for both the set of clips on the First Side of the tenter and on the opposite Second Side of the tenter.

TABLE 2

| | First Side | | | | Second Side | | | |
|---|---|---|---|---|---|---|---|---|
| Ex. | $D_1$-$I_1$ | $I_1$-$I_2$ | $I_2$-$D_2$ | Total | $D_1$-$I_1$ | $I_1$-$I_2$ | $I_2$-$D_2$ | Total |
| 1 | 3.5 | −1.0 | −2.5 | 6.1 | 2.1 | −1.1 | −1.0 | 3.1 |
| 2 | 12.8 | −1.7 | −11.1 | 23.9 | 8.6 | −1.5 | −7.1 | 15.7 |
| 3 | 5.3 | −0.3 | −5.0 | 10.3 | 3.7 | 0.0 | −3.7 | 7.5 |
| 4 | 2.7 | −0.7 | −2.1 | 4.8 | 0.4 | −0.5 | 0.1 | 0.3 |
| 5 | 11.0 | −1.4 | −9.5 | 20.5 | 6.4 | −1.0 | −5.4 | 11.8 |
| 6 | −1.7 | −1.0 | 2.7 | −4.4 | −2.5 | −0.9 | 3.4 | −5.9 |

From the results presented in Table 2, it can be seen that idler clip lagging in Example 1 of 6.1 on one side and 3.1 on the other side can be reduced to 4.8 and 0.3 respectively, with the addition of edge cooling in Example 4. Furthermore, idler clip lagging in Example 2 of 23.9 and 15.7, can be reduced to 20.5 and 11.8, respectively, with the addition of edge cooling in Example 5. Also, idler clip lagging of 10.3 and 7.5 of Example 3 can be changed to idler clip lead of 4.4 and −5.9 with the addition of edge cooling in Example 6. The Examples also suggest that, if idler clip lag can be reduced (examples 4 and 5), or changed to idler clip lead (example 6), a set of edge cooling conditions can be found which would lead to ideal idler clip spacing.

EXAMPLES 7–10

The following examples were prepared on a linear motor tenter generally as described in the '225 patent discussed above, which had two idler clips between each pair of driven clips. A continuous polypropylene cast sheet (Fina 3374x, from Fina Chemical, Houston, Tex.) was extruded at a thickness of approximately 0.054 inches (1.36 mm) and 13.8 inches wide (350 mm), and quenched on a chill roll/water bath system. The film was passed between a set of infrared heaters (IR heater), then into a linear motor tenter oven. For examples 7–10, the IR heat temperature was set at 500° C., oven preheat zone temperatures (Zones 1–3) were set at 207° C., 205° C., and 193° C. respectively, and the stretch zone temperatures (Zones 4–5) were set at 160° C. and 155° C. respectively. The relaxation (Zone 6) and the post-stretch treatment (Zones 7–9) temperatures were set as listed in Table 3. In each of these examples, the final stretch ratios were 6.3:1 in the MD and 6.3:1 in the TD. The MD and TD stretches were performed simultaneously in Zones 4 and 5. All of these stretch profiles were linear with respect to machine position, and include 10% stretch relaxation in both MD and TD that occurred in Zone 6.

EXAMPLE 7

Example 7 included cooling air in Zone 6 that was 5° C. cooler than the temperature of Zone 5.

EXAMPLE 8

Example 8 prepared according to Example 7, with the exception of the use of 15° C. cooling in Zone 6.

EXAMPLE 9

Example 9 was prepared according to Example 7, with the exception of the use of 20° C. cooling in Zone 6.

EXAMPLE 10

Example 10 was prepared according to Example 7, with the exception of the use of 25° C. cooling in Zone 6.

TABLE 3

Stretching Conditions

| | Relax Zone Temp. (° C.) | Anneal Zone Temperature (° C.) | | |
|---|---|---|---|---|
| Example | Zone 6 | Zone 7 | Zone 8 | Zone 9 |
| 7 | 150 | 150 | 140 | 130 |
| 8 | 140 | 140 | 140 | 130 |

TABLE 3-continued

Stretching Conditions

| Example | Relax Zone Temp. (° C.) Zone 6 | Anneal Zone Temperature (° C.) | | |
|---|---|---|---|---|
| | | Zone 7 | Zone 8 | Zone 9 |
| 9 | 135 | 135 | 135 | 130 |
| 10 | 130 | 125 | 125 | 125 |

The spacing between the clips was measured on the output film and the idler clip lagging calculated and reported in Table 4 as discussed earlier. All values are reported for both the sets of clips on the First Side of the tenter and on the opposite Second Side of the 520 C. in cooling Zone 7.

TABLE 4

| | First Side | | | | Second Side | | | |
|---|---|---|---|---|---|---|---|---|
| Ex. | $D_1$-$I_1$ | $I_1$-$I_2$ | $I_2$-$D_2$ | Total | $D_1$-$I_1$ | $I_1$-$I_2$ | $I_2$-$D_2$ | Total |
| 7 | 7.9 | −1.4 | −6.3 | 14.2 | 4.8 | −1.1 | −3.7 | 8.5 |
| 8 | 3.7 | −1.6 | −2.2 | 5.9 | 2.0 | −1.6 | −.4 | 2.4 |
| 9 | 0.6 | 0.6 | −1.2 | 1.8 | 2.6 | 0.2 | −1.6 | 4.1 |
| 10 | 1.3 | −1.7 | 0.4 | 0.9 | −0.7 | −1.3 | 1.9 | −2.6 |

From the results presented in Table 4, it can be seen that idler clip lagging in Example 7 of 14.2 on one side and 8.5 on the other side can be decreased with the addition of a sufficient amount of zone cooling, after the onset of stretching, as shown in Examples 8–10. In particular, as shown with Examples 9 and 10, the amount of overall lagging is less than 5%.

EXAMPLE 11

Example 11 was prepared on a linear motor tenter generally as described in the 225 patent discussed above, which had two idler clips between each pair of driven clips. A continuous polypropylene cast sheet (Fina 3374x, from Fina Chemical, Houston, Tex.) was extruded at a thickness of approximately 0.055 inches (1.39 mm) and 13.8 inches wide (350 mm), and quenched on a chill roll/water bath system. The film was passed between a set of infrared heaters (IR heater), then into a linear motor tenter oven. The IR heat temperature was set at 600° C., oven preheat zone temperatures (Zones 1–3) were set at 184° C., 177° C., and 156° C. respectively, and the stretch zone temperatures (Zones 4–5–6–7) were set at 152° C., 170° C., 170° C., and 170° C. respectively. The relaxation (Zone 8) and the post-stretch treatment (Zone 9) temperatures were both set at 15° C. In this example, the final stretch ratios were 5.8:1 in the MD and 9.0:1 in the TD. The MD stretch was performed in Zones 4 and 5 and the TD stretch was performed in Zones 4 through 7. The stretch profile includes a 10% stretch relaxation in both directions in Zone 8.

The tests and test results described above are intended solely to be illustrative, rather than predictive, and variations in the testing procedure can be expected to yield different results.

The present invention has now been described with reference to several for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. In a method of stretching a polymeric film comprising the steps of grasping the film with a plurality of clips along the opposing edges of the film and propelling the clips to thereby stretch the film, wherein the plurality of clips includes driven clips and idler clips, with at least one idler clip between respective pairs of driven clips, the improvement comprising:
   a) heating the polymeric film to a sufficiently high temperature to allow a significant amount of stretching without breaking; and
   b) actively imparting a machine direction cooling gradient to at least a portion of the width of the stretched film in an effective amount to improve the uniformity of spacing of the driven and idler clips.

2. The method of claim 1, wherein step b) includes cooling the opposed edge portions of the film.

3. The method of claim 1, wherein step b) includes cooling the center portion of the film.

4. The method of claim 1, wherein step b) includes cooling substantially the entire width of the film.

5. The method of claim 1, wherein step b) includes cooling at least a portion of the film by at least 3° C.

6. The method of claim 1, wherein the method further includes propelling the clips through a stretch section in which the film is stretched and subsequently through a post-stretch treatment section, and wherein step b) is performed in at least one of the stretch section and the treatment section.

7. The method of claim 1, wherein there are at least two idler clips between each respective pair of driven clips.

8. The method of claim 1, wherein the method includes biaxially stretching the film.

9. The method of claim 8, wherein the method includes simultaneously biaxially stretching the film by propelling the clips at varying speeds in the machine direction along clip guide means that diverge in the transverse direction.

10. The method of claim 9, wherein the method includes stretching the film to a final stretch ratio of at least 2:1 in the machine direction and at least 2:1 in the transverse direction.

11. The method of claim 1, wherein the film comprises a thermoplastic film.

12. The method of claim 11, wherein the film comprises an amorphous film.

13. The method of claim 11, wherein the film comprises a semi-crystalline film.

14. The method of claim 13, wherein the semi-crystalline film has a degree of crystallinity greater than about 1% prior to said heating.

15. The method of claim 13, wherein the semi-crystalline film has a degree of crystallinity greater than about 7% prior to said heating.

16. The method of claim 13, wherein the semi-crystalline film has a degree of crystallinity greater than about 30% prior to said heating.

17. The method of claim 11, wherein the film comprises a vinyl polymer.

18. The method of claim 17, wherein the film comprises a polyolefin.

19. The method of claim 18, wherein the film comprises polyethylene.

20. The method of claim 18, wherein the film comprises polypropylene.

21. The method of claim 20, wherein the method includes stretching the film to a final area stretch ratio of at least 16:1.

22. The method of claim 21, wherein the method includes stretching the film to a final area stretch ratio of from 25:1 to 100:1.

23. The method of claim 20, wherein step a) comprises heating the film to from 120 to 165° C.

24. The method of claim 23, wherein step a) comprises heating the film to from 150 to 165° C.

25. The method of claim 23, wherein step b) includes forcing cooling air onto the film, wherein the cooling air is at least 5° C. cooler than the film.

26. In a method of stretching a pre-crystallized polymeric film comprising the steps of grasping the film with a plurality of clips along the opposing edges of the film and propelling the clips to thereby stretch the film, wherein the plurality of clips includes driven clips and idler clips, with at least one idler clip between respective pairs of driven clips, the improvement comprising:
  a) heating the polymeric film to a sufficiently high temperature to allow a significant amount of stretching without breaking; and
  b) imparting a machine direction cooling gradient to at least a portion of the width of the film in an effective amount to improve the uniformity of spacing of the driven and idler clips.

27. The method of claim 26, wherein step b) includes actively cooling the opposed edge portions of the film.

28. The method of claim 26, wherein step b) includes actively cooling the center portion of the film.

29. The method of claim 26, wherein step b) includes actively cooling substantially the entire width of the film.

30. The method of claim 26, wherein the method further includes propelling the clips through a stretch section in which the film is stretched and subsequently through a post-stretch treatment section, and wherein step b) is performed in at least one of the stretch section and the treatment section.

31. The method of claim 26, wherein the method includes simultaneously biaxially stretching the film by propelling the clips at varying speeds in the machine direction along clip guide means that diverge in the transverse direction.

32. The method of claim 26, wherein the film comprises polypropylene.

33. The method of claim 32, wherein the method includes stretching the film to a final area stretch ratio of from 16:1 to 100:1.

34. The method of claim 32, wherein step a) comprises heating the film to from 120 to 165° C.

35. The method of claim 34, wherein step b) includes forcing cooling air onto the film, wherein the cooling air is at least 5° C. cooler than the film.

36. In a method of stretching a vinyl polymer film comprising the steps of grasping the film with a plurality of clips along the opposing edges of the film and propelling the clips to thereby stretch the film, wherein the plurality of clips includes driven clips and idler clips, with at least one idler clip between respective pairs of driven clips, the improvement comprising:
  a) heating the vinyl polymer film to a sufficiently high temperature to allow a significant amount of stretching without breaking; and
  b) imparting a machine direction cooling gradient to at least a portion of the width of the stretched film in an effective amount to improve the uniformity of spacing of the driven and idler clips.

37. The method of claim 36, wherein step b) includes actively cooling the opposed edge portions of the film.

38. The method of claim 36, wherein step b) includes actively cooling the center portion of the film.

39. The method of claim 36, wherein step b) includes actively cooling substantially the entire width of the film.

40. The method of claim 36, wherein the method further includes propelling the clips through a stretch section in which the film is stretched and subsequently through a post-stretch treatment section, and wherein step b) is performed in at least one of the stretch section and the treatment section.

41. The method of claim 36, wherein the method includes simultaneously biaxially stretching the film by propelling the clips at varying speeds in the machine direction along clip guide means that diverge in the transverse direction.

42. The method of claim 36, wherein the film comprises polypropylene.

43. The method of claim 42, wherein step a) comprises heating the film to from 120 to 165° C.

44. The method of claim 43, wherein the method includes stretching the film to a final area stretch ratio of from 16:1 to 100:1.

45. The method of claim 43, wherein step b) includes forcing cooling air onto the film, wherein the cooling air is at least 5° C. cooler than the film.

46. In a method of stretching a polymeric film comprising the steps of grasping the film with a plurality of clips along the opposing edges of the film and propelling the clips to thereby stretch the film, wherein the plurality of clips includes driven clips and idler clips, with at least one idler clip between respective pairs of driven clips, the improvement comprising:
  a) heating the center portion and edge portions of the polymeric film to a sufficiently high temperature to allow a significant amount of stretching without breaking;
  b) at the onset of stretching, maintaining the edge portions of the film no hotter than the center portion of the film; and
  c) imparting a machine direction cooling gradient at least a portion of the width of the stretched film in an effective amount to improve the uniformity of spacing of the driven and idler clips.

47. The method of claim 46, wherein step b) includes actively cooling the opposed edge portions of the film.

48. The method of claim 46, wherein step c) includes cooling the center portion of the film.

49. The method of claim 46, wherein step c) includes cooling the opposed edge portions of the film.

50. The method of claim 46, wherein step c) includes cooling substantially the entire width of the film.

51. The method of claim 46, wherein step c) includes cooling at least a portion of the film by at least 3° C.

52. The method of claim 46, wherein the method further includes propelling the clips through a stretch section in which the film is stretched and subsequently through a post-stretch treatment section, and wherein step c) is performed in at least one of the stretch section and the treatment section.

53. The method of claim 46, wherein the method includes biaxially stretching the film.

54. The method of claim 53, wherein the method includes simultaneously biaxially stretching the film by propelling the clips at varying speeds in the machine direction along clip guide means that diverge in the transverse direction.

55. The method of claim 46, wherein the film comprises a thermoplastic film.

56. The method of claim 55, wherein the film comprises an amorphous film.

57. The method of claim 55, wherein the film comprises a semi-crystalline film.

58. The method of claim 57, wherein the semi-crystalline film has a degree of crystallinity greater than about 30% prior to said heating.

59. The method of claim 57, wherein the semi-crystalline film has a degree of crystallinity greater than about 1% prior to said heating.

60. The method of claim 59, wherein the semi-crystalline film has a degree of crystallinity greater than about 7% prior to said heating.

61. The method of claim 55, wherein the film comprises a vinyl polymer.

62. The method of claim 61, wherein the film comprises a polyolefin.

63. The method of claim 62, wherein the film comprises polyethylene.

64. The method of claim 62, wherein the film comprises polypropylene.

65. The method of claim 64, wherein the method includes stretching the film to a final area stretch ratio of from 16:1 to 100:1.

66. The method of claim 64, wherein step a) comprises heating the film to from 150 to 165° C.

67. The method of claim 64, wherein step a) comprises heating the film to from 120 to 165° C.

68. The method of claim 67, wherein step c) includes forcing cooling air onto the film, wherein the cooling air is at least 5° C. cooler than the film.

\* \* \* \* \*

UNITED STATES PATENT AND TRADEMARK OFFICE
CERTIFICATE OF CORRECTION

PATENT NO. : 7,037,461 B1
APPLICATION NO. : 09/469972
DATED : May 2, 2006
INVENTOR(S) : Martin E. Denker It is certified that error appears in the above-identified patent and that said Letters Patent is hereby corrected as shown below:

Column 10,
Line 35, Delete "D1-D2." and insert -- $D_1$-$D_2$. --, therefor.

Column 11,
Line 10 (approx.), Delete "12" and insert -- $I_2$ --, therefor.
Line 25 (approx.), Delete "$I_1$," and insert -- $I_1$ --, therefor.

Column 13,
Line 49, Delete "-[CWX-CYZ]$_n$," and insert -- -[CWX-CYZ]$_n$- --, therefor.

Column 16,
Line 45, Delete "140%" and insert -- 1 – 40% --, therefor.

Column 19,
Line 27 (approx.), Delete "$I_l$" and insert -- $I_1$ --, therefor.
Line 29 (approx.), Delete "$I_1$-$D_2$," and insert -- $I_1$-$I_2$, --, therefor.
Line 63, Delete "4.4" and insert -- –4.4 --, therefor.

Column 20,
Line 56, Delete "Zone 6." And insert -- Zone 6 and an additional 5° C. in Zone 7. --, therefor.

Column 21,
Line 17 (approx.), Delete "520 C. in cooling Zone 7." and insert -- tenter. --, therefor.
Line 52 (approx.), Delete "15° C." and insert -- 158° C. --, therefor.

Signed and Sealed this

Sixth Day of February, 2007

JON W. DUDAS
*Director of the United States Patent and Trademark Office*